Sept. 25, 1923.                    1,468,918
J. OWENS
GREASE CUP
Filed April 30, 1921
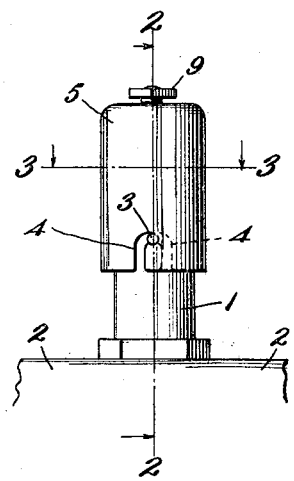
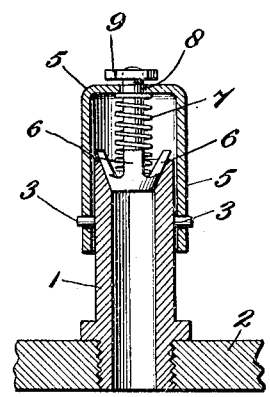
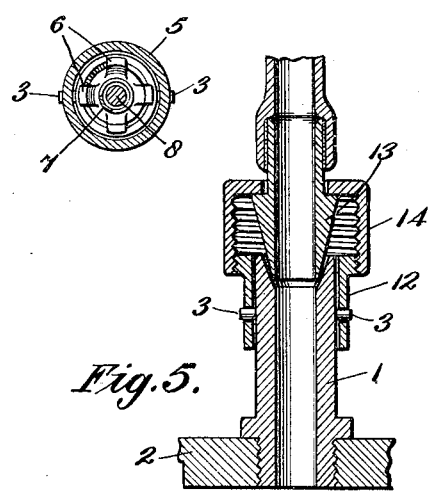
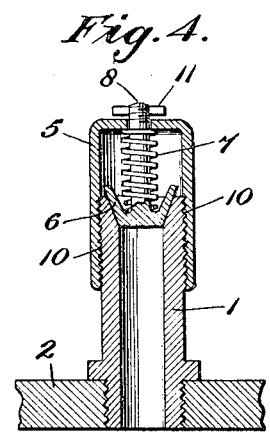
Inventor
John Owens, by
Attorney Patented Sept. 25, 1923.

1,468,918

UNITED STATES PATENT OFFICE.

JOHN OWENS, OF WASHINGTON, DISTRICT OF COLUMBIA.

GREASE CUP.

Application filed April 30, 1921. Serial No. 465,636.

*To all whom it may concern:*

Be it known that I, JOHN OWENS, a citizen of the United States, residing at Washington, in the District of Columbia, have invented certain new and useful Improvements in Grease Cups, of which the following is a specification.

This invention relates to grease cups and more particularly to those grease cups that are attached to the bearing parts of automobiles or other vehicles using grease in a semi-fluid condition.

The primary object of the present invention is to furnish a grease cup that will remain tightly closed after the grease is inserted therein and yet which can be easily opened for the insertion of additional supplies of grease, and furthermore will exclude dirt or dust from the mouth of the cup.

Another object of the invention is to arrange the grease cup so that it will readily receive not only the stopper or valve which prevents the grease from escaping but may be adapted to receive a nozzle through which the grease may be forced into the grease cup from a grease gun or similar apparatus, the grease cup being adapted to receive the nozzle and by an appropriate device hold it firmly clasped against the cup during the time the grease is being discharged from the gun into the cup.

With the foregoing objects outlined and other objects in view which will appear as the description proceeds the invention consists in the novel features hereinafter described in detail, illustrated in the accompanying drawing and more particularly pointed out in the appended claims.

Referring to the drawings;

Figure 1 is a view of the grease cup attached to the part to be lubricated.

Fig. 2 is a section of the same on the line 2—2 of Fig. 1.

Fig. 3 represents a horizontal section on the line 3—3 of Fig. 1;

Fig. 4 is a section similar to Fig. 2 of a modification of the invention.

Fig. 5 is a section of the cup with a nozzle of a grease gun attached thereto through which the grease is inserted into the cup.

In the drawing 1 designates a cup proper attached to any part 2 to be lubricated.

In the modification shown in Fig. 2, pins 3—3 extend from the sides of the cup and in connection with slots 4 in the sleeve or cap 5 form a pin and slot connection for holding the sleeve onto the cup.

It will be noted that the end of the cup may be cone-shaped and in it fits a closure 6 which also may be cone-shaped and the closure may be held firmly against the cone-shaped mouth of the cup by a spring 7 which rests against the inner surface of the flange or top of the sleeve 5 and against the conical head of the closure or stopper.

The valve or stopper has a stem 8 which is encircled by the spring 7 and which at its top projects through a hole in the flanged sleeve 5 and may have a head or cap 9 attached thereto to prevent the stopper from passing out of the cap when the cap is removed from the cup.

It is obvious that the screw thread 10 of the modification shown in Fig. 4 may be substituted for the pin and slot connection shown in the modification of Figs. 1 and 2 and that the pin 11 may be substituted for the flanged sleeve 9 of the modification in Fig. 2.

Upon removal of the cap and stopper shown in Figs. 2 or 4 for purpose of injecting the grease into the cup, a collar or sleeve 12 having slots therein similar to the slots 4 in the cap may be attached to the cup. The cone-shaped nozzle 13 can then be inserted in the cone-shaped end of the cup 1 and on screwing down a sleeve or cap 14 over the screw threaded end of the sleeve 12, the nozzle 13 may be held tightly onto the end of the cup to prevent any leakage of the grease as it is injected through the nozzle into the cup.

After the cup is filled a short turn of the sleeve 14 will loosen the nozzle 13 and allow the sleeve or nozzle 12 to be withdrawn from the cup when the sleeve or cap 5 with its stopper 6 is again replaced on the cup to prevent the escape of the grease therefrom.

From the foregoing I believe that the construction, operation and advantages of my improved cup and connections will be readily understood by those skilled in the art and I am aware that various changes may be made in the construction illustrated without departing from the spirit of the invention as expressed in the following claims.

I claim as my invention:

1. A grease cup having means at one end to attach it to a part to be lubricated and a seat at the other end of the cup, a sleeve to fit the cup, means to hold the sleeve to the cup, a part to fit the seat, and means separable from said sleeve but co-active therewith, to hold the part to the seat, said part extending entirely through said separable means, and said part having means thereon to prevent disengagement from said separable means.

2. A grease cup comprising a tube having means at one end to attach it to a part to be lubricated and a seat at the other end of the tube, a sleeve to fit the cup, a pin and slot to hold the sleeve to the cup, a headed tubular part to fit the seat, and means screw-threaded on said sleeve and co-active with the headed tubular part to hold the parts to the seat during the insertion of the grease.

In testimony whereof I affix my signature.

JOHN OWENS.